UNITED STATES PATENT OFFICE.

RUPERT GREVILLE-WILLIAMS, OF ALBANY, NEW YORK, ASSIGNOR TO THE ALBANY COAL TAR DYE AND CHEMICAL COMPANY, OF SAME PLACE.

MANUFACTURE OF AZO COLORS.

SPECIFICATION forming part of Reissued Letters Patent No. 11,179, dated July 21, 1891.

Original No. 417,207, dated December 10, 1889. Application for reissue filed April 21, 1891. Serial No. 389,867.

*To all whom it may concern:*

Be it known that I, RUPERT GREVILLE-WILLIAMS, a citizen of Great Britain, and a resident of Albany, in the county of Albany and State of New York, have invented certain new and useful Improvements in the Manufacture of Coloring-Matters, of which the following is a specification.

In my application for patent filed August 6, 1889, I have described a process for the production of new coloring-matters from the combination of new intermediate bodies with phenols and amines.

I have now found that isomeric coloring-matters are produced by first combining one molecule of a tetrazo body with one molecule of an amine, and then combining one molecule of an azotized amine to this primary intermediate product, and finally reacting on the thus-produced secondary intermediate with one molecule of amine or phenol.

The following are examples of how I carry out the process practically:

*Example* 1.—Tetrazoditolyl formed from thirty-two pounds of tolidine sulphate or its equivalent of the base and fourteen pounds of nitrite of soda is combined with twenty-five pounds of naphthionate of soda in presence of a sufficient quantity of acetate of soda. Then all the tetrazo compound is combined with the naphthionate of soda, to form the primary intermediate body. The diazo-naphthaline monosulpho-acid resulting from the azotization of twenty-five pounds of naphthionate of soda with seven pounds of nitrite of soda in presence of hydrochloric acid is added to form the secondary intermediate. This diazonaphthaline monosulpho-acid must, however, have added to it (before its introduction into the before-mentioned primary intermediate) either enough caustic soda to bring it into solution or sufficient acetate of soda to bind all the mineral acid present. The thus-produced secondary intermediate is stirred until all the diazonaphthaline monosulpho-acid is combined, and then twenty-five pounds of naphthionate of soda are added. The temperature is raised to 45° centigrade for forty-eight hours, and after that to boiling-point, when sufficient caustic soda is introduced to precipitate the color in the form of a red paste. After filtering, the color is pressed and dried at a temperature below 100° centigrade.

*Example* 2.—Tetrazodiphenyl+beta-naphthylamine monosulpho-acid+diazo-benzine sulpho-acid+orcin.

*Example* 3.—Tetrazoditolyl+naphthionic acid+diazo-benzine sulpho-acid+beta-naphthylamine monosulpho-acid.

*Example* 4.—Tetrazoditolyl+naphthylamine+diazo-alpha-naphthaline monosulpho-acid+naphthionic acid.

The amines and phenols which may be employed for the production of these coloring-matters are, first, aniline and its homologues, the naphthylamines, diphenylamine and its homologues; second, the alkylized products of above amines; third, sulpho-acids of one and two; fourth, carbolic acid and its homologues; fifth, resorcin and its homologues, and, sixth, sulpho-acids of four and five.

By tetrazo bodies I mean tetrazo-diphenyl and its homologues, tetrazo-stilbene, tetrazo-fluorine, tetrazo-naphthaline, tetrazo-diphenolether, tetrazo azo benzine and its homologues, tetrazo oxydiphenyl and its homologues, as well as the alkylized compounds, or the carbo or sulpho acids of the same. The brown to red powder thus obtained is soluble in water and concentrated oil of vitriol and insoluble in weak acids, very slightly soluble in strong alcohol, and more soluble in weak alcohol. Fibers dyed with this color are decolorized upon treatment with stanous chlorides and hydrochloric acid.

Having now described my invention, what I claim, and desire to secure by Letters Patent, is—

1. The herein-described process for the production of new coloring-matters, which process consists in combining one molecule of one of the herein-mentioned tetrazo bodies with one molecule of one of the herein-mentioned amines, and then combining a molecule of an azotized amine with the thus-produced primary intermediate product, and afterward reacting on the resulting secondary intermediate with one molecule of one of the herein-mentioned amines or phenols, substantially as set forth.

2. The red substantive azo coloring-matters produced as herein described, having the property of dyeing unmordanted cotton in an alkaline or soap bath, and which are insoluble in weak acids but soluble in dilute alkalies, substantially as set forth.

RUPERT GREVILLE-WILLIAMS.

Witnesses:

HENRY H. LEIGH,
22 *Southampton Buildings, London.*

JOSEPH LAKE,
17 *Gracechurch St., London.*